United States Patent Office 3,005,359
Patented Oct. 24, 1961

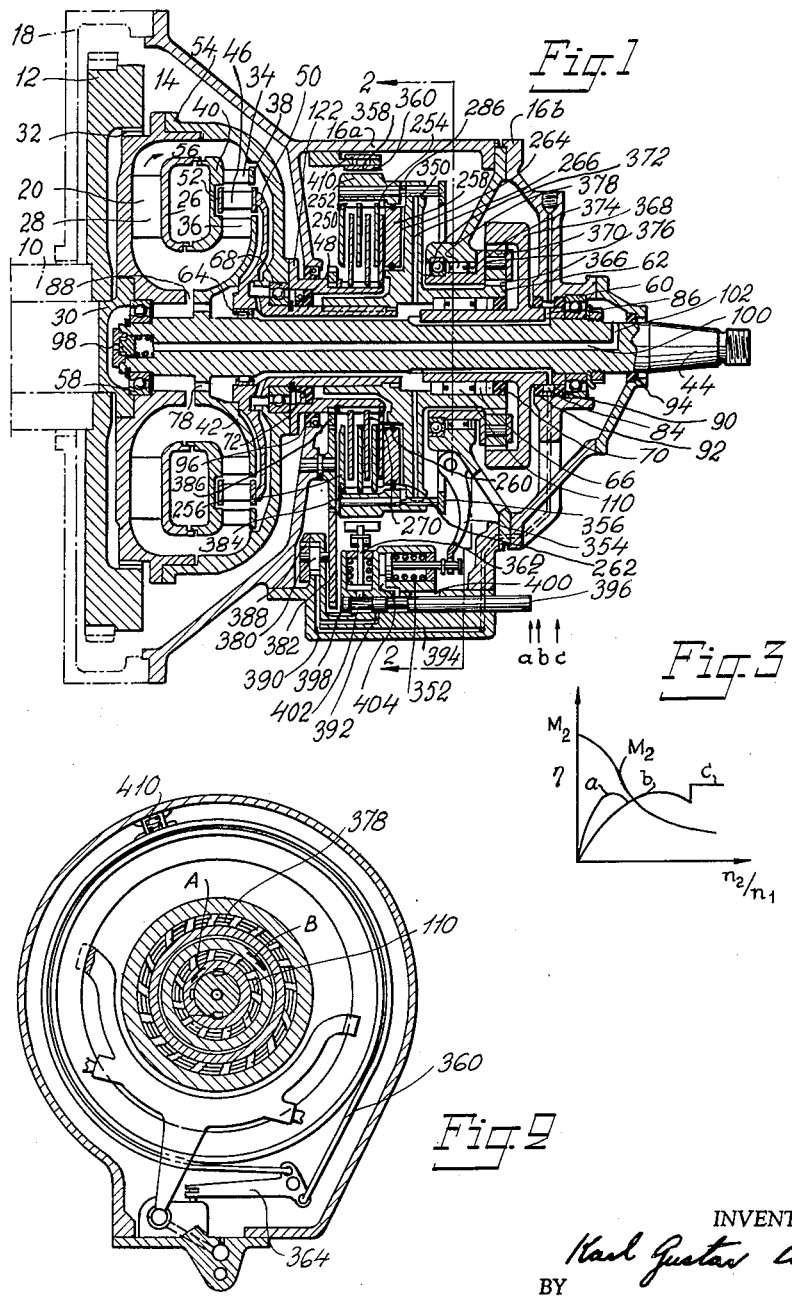

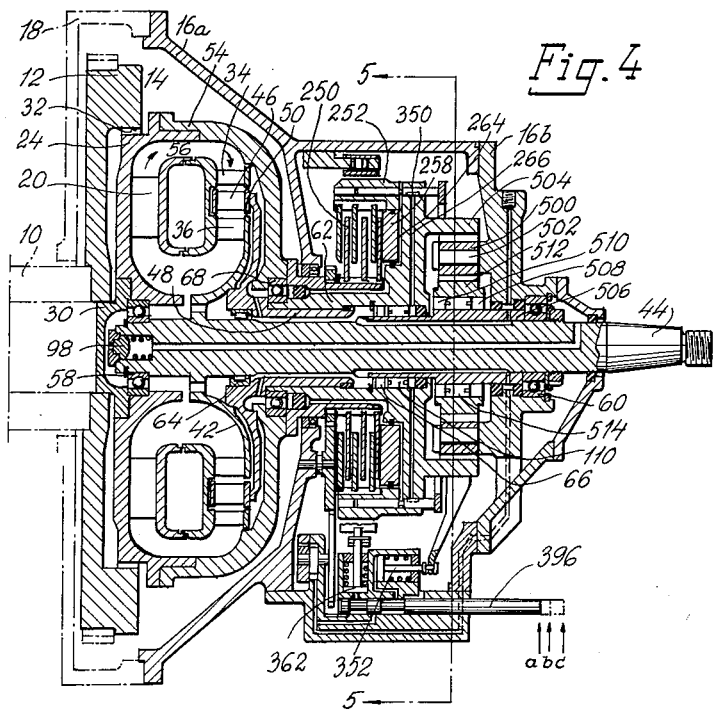
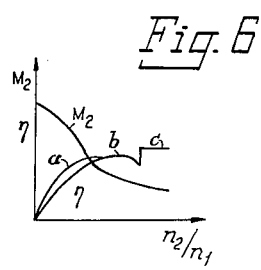
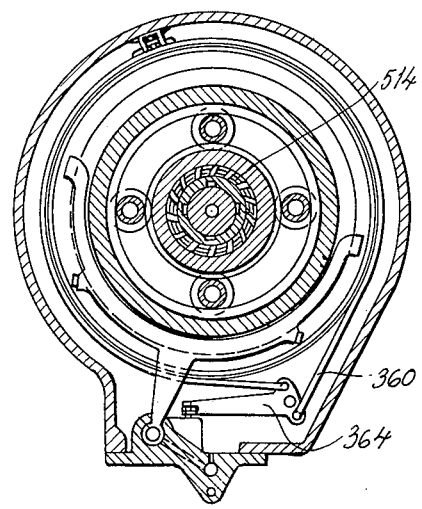
Fig. 4
Fig. 6
Fig. 5

1

3,005,359
HYDRAULIC TORQUE CONVERTER OF THE CLOSED CIRCUIT TYPE
Karl Gustav Åhlén, Stockholm, Sweden, assignor, by mesne assignments, to Svenska Rotor Maskiner Aktiebolag, Nacka, Sweden, a corporation of Sweden
Continuation of application Ser. No. 342,907, Mar. 17, 1953, which is a division of application Ser. No. 29,446, May 27, 1948, now Patent No. 2,719,616, dated Oct. 4, 1955. This application July 9, 1958, Ser. No. 747,412
4 Claims. (Cl. 74—732)

This application is a continuing application in replacement of my copending application Serial No. 342,-907 filed March 17, 1953, now abandoned, the latter application being a division of my application Serial No. 29,446 filed May 27, 1948, and now matured into U.S. Patent No. 2,719,616 patented October 4, 1955, and relates back to the aforementioned applications and patent for all dates and rights incident to the filing thereof and to the corresponding Swedish application filed May 28, 1947.

This invention relates to an hydraulic torque converter of the kind consisting of a primary (pump) member, a secondary (turbine) member having two or three stages and a guide blade (reaction) member having one or two stages with the guide blades operating under some conditions as a turbine member or members rotating in a direction opposite to the direction of rotation of the pump.

In such devices with rising speed of the turbine member relative to the speed of rotation of the pump the secondary torque will finally become less than the primary torque so that such power transmission devices are generally provided with a device for direct coupling of the primary and the secondary shafts at the torque ratio prevailing when the ratio $$\frac{n_2}{n_1}$$

between the rotary speed of the secondary and primary shafts is unity. Some hydraulic systems are constructed so as to operate as hydraulic couplings at speed ratios above that speed ratio where direct coupling is to be preferred. In other systems the construction is such that the hydraulic drive is completely uncoupled and a direct coupling between the primary and secondary shafts is brought into operation.

The object of the present invention is to provide a transmission device having a ring or rings of reaction or guide blades operating as a turbine rotating in a direction opposite to that of the pump in one part of the working range and in other parts of the working range acting as a stationary guide blade ring, which is of high maximum efficiency.

According to the present invention in an hydraulic torque converter of the kind set forth above each blade ring of the guide blade member is arranged wholly in that part of the hydraulic circuit in which flow of working liquid is directed radially inwardly.

In order to obtain the desired high efficiency the above mentioned location of the guide blade member is necessary because when said member acts as a turbine, the ventilation losses set up between the oppositely rotating members, in consequence of the considerable relative speeds between said members, are of such magnitude as to adversely affect the overall efficiency, and these losses increase very rapidly when the outer bend of the hydraulic circuit is bounded by the disc of the guide blade ring, that is when the discs carrying the guide blades have at their outer side an axially extending part. This should be eliminated as far as possible.

2

With a device so constructed with the reaction member arranged for rotation in both directions the resultant advantages are that during its rotation opposite to the pump and secondary members on starting, a steeply rising efficiency curve is obtained and therewith a high torque transmission provided that the torque of the reaction member is utilized by being transferred to the secondary shaft through a reversing gear. Under such conditions the efficiency curve rapidly falls after reaching its peak. It is thus advisable at this stage to terminate the opposite rotation of the reaction member and for this purpose the device should be provided with a brake or locking device intended to prevent rotation of the reaction member in a direction opposite to the primary and secondary members. If this locking device is arranged so as to be applicable when desired the power transmission device at the beginning of the starting period with the locking member out of action operates with opposite rotation of the reaction member and subsequently, on switching in the locking device is transformed into a drive with a stationary reaction member. When the rotary speed suitable for direct drive is reached, the locking device is again released and the reaction member coupled direct to the primary and secondary members of the transmission, thus forming a power transmitting member coupling the primary and secondary members and rotating therewith. To provide a simpler construction of the transmission a locking device may be provided which merely prevents rotation of the reaction member in a direction opposite to the primary and secondary members. A simple device for this purpose may comprise a free wheel device, an automatic brake or an automatic claw coupling.

For coupling the reaction member to the primary member, claw couplings can be used which if desired may be synchronized with friction couplings, such as plate or centrifugal weight couplings or the like while the coupling between the reaction member and the secondary member may be formed more simply and may consist, for example, of a free wheel or an automatic brake preventing the reaction member rotating more rapidly than the secondary member.

The invention will be hereinafter more fully described with reference to the embodiments thereof shown by way of example in the accompanying drawings, in which:

FIG. 1 shows a converter constructed according to the invention with the reaction member arranged for rotation in both directions and provided with a reversing gear for transmitting torque from the reaction member to the output shaft;

FIG. 2 is a section on the line 2—2 of FIG. 1;

FIG. 3 is a diagram showing the efficiency, tractive effort and secondary torque with the different converter drives as functions of the speed ratio $n_2/n_1$ for an arrangement as shown in FIG. 1;

FIG. 4 shows an arrangement of the same type as that shown in FIG. 1 but with a different reversing gear;

FIG. 5 is a section on the line 5—5 of FIG. 4; and

FIG. 6 shows a diagram corresponding to that of FIG. 3 for the arrangement shown in FIG. 4.

Referring to the drawings, 10 indicates the crank shaft and 12 the flywheel of a combustion engine cooperating with an hydraulic converter denoted generally by 14. The stationary housing of the converter is in the embodiment of FIG. 1 composed of two parts 16a and 16b, rigidly connected to each other and to the engine casing 18, and together with the crank shaft 10 serving as a support for the rotatable members, bearings and seals of the converter.

The primary member or pump 20 of the converter is of the centrifugal type, consisting of pump discs 24, 26 and pump blades 28, supported and driven by the flywheel 12 through the hub element 30 and the toothed rims 32. The secondary or turbine member consists of two blade rings 34 and 36, the blades of which are located between and rigidly connected to annular discs 38 and 40 and between disc 40 and a disc 42 extending from the turbine shaft 44. The reaction or guide member of the system consists of a blade ring 46, inserted between the two turbine blade rings 34 and 36 and supported by a disc 50 extending from a guide member shaft 48, the guide blades being fixed between said disc and an annular disc 52.

In this way the inlet edge of the blade ring 46 is arranged to be on a smaller diameter than the outer diameter of the inner bounding wall 40 of the hydraulic circuit.

The blade system of the converter is thus of the two-stage type having a rotating outer pump casing according to a known design. The circuit of the liquid working medium is outwardly bounded by the rotating pump casing consisting of the pump disc 24 and its extension in the form of a shell 54, and further by the discs 38 and 42 and by the outer part of the disc 50. The inner bounding wall of said circuit is formed by the impeller disc 26 and the discs 40 and 52. The direction of flow of the liquid is indicated by the arrows 56. If desired the outer bend of the hydraulic circuit may include the turbine ring 34.

The turbine shaft 44 is journalled coaxially with the crank shaft on two bearings 58 and 60, which are carried by the pump disc 24 and the stationary casing 16b, respectively.

The hollow guide blade shaft 48 with its extension 62 centrally surrounding the turbine shaft 44, are centered in relation to said shaft 44 by means of bearings 64 and 66 while a third bearing 68 supports and centers the guide blade shaft relative to the shell 54, forming part of the rotating pump casing.

In order to prevent leakage between the turbine shaft 44 and the buide blade shaft extension 62 a seal 70 is provided and for the same reason a seal 72 is inserted between the guide shaft 48 and the rotating pump casing.

As the liquid of the hydraulic system preferably operates under a certain basic pressure an auxiliary pump 380 sucks in a quantity of liquid from a container and forces it preferably with intermediate cooling through a bore 394 to a distributing chamber 84 and further through bores 86 through the space between the turbine and guide blade shafts thence through bores 78 in the disc 42 into the hydraulic circuit through a space 88 between the discs 24 and 42. Seals 90 and 92 disposed on each side of the distributing chamber 84 prevent unnecessary leakage flow back to the container which is sealed relative to the rotating parts of the converter at 94 and 96.

Harmful pressure-rise in the hydraulic system is prevented by a spring-loaded valve 98, normally closed, but returning part of the liquid from the circuit to the container by conduits 100 and 102 arranged in turbine shaft 44 in the case of the pressure rising above that allowed.

In order to obtain direct drive with a torque converter as described above without the use of an intermediate shaft between the crank shaft and the driven shaft connected to the turbine shaft 44, a free-wheel 110 is inserted between the turbine shaft 44 and the guide shaft extension 62, which latter is rigidly connected to said guide shaft 48. This free-wheel 110 is so designed as to prevent the guide or reaction member from rotating faster than the turbine shaft 44 when the reaction and the secondary members rotate in the same direction.

In the devices shown in FIGS. 1 and 2 the coupling between the primary and reaction members consists of a liquid-actuated friction clutch 250. The inlet and outlet openings for the operating liquid to and from clutch are controlled automatically by a valve system receiving its controlling impulses from the guide blade member.

Obviously the changeover may, if desired, be effected manually or controlled by a separate device.

The extension 62 of the guide member shaft is formed with an axial flange member 252 carrying three friction discs 254, a stationary side wall 256 and a second axially movable side wall (or plunger) 258, the latter wall being sealed against the flange 252 by sealing members 260 and 262 at the inner and outer circumference so as to form an operating chamber 264 for the pressure liquid delivered by the gear pump 380. Through a radial bore 266 in the radial support of said flange 252 the operating chamber 264 can open to or be cut off from the channel system for pressure liquid from the pump by shifting a valve 350, mounted in the outer part of said bore 266. On cutting off the operating chamber 264 from communication with the pressure liquid the valve 350 simultaneously opens an outlet 286 for emptying said operating chamber. The primary member of the friction clutch consists of three discs 270, supported by a hub 122 fixed to the shell 54.

As above mentioned the converted shown in FIGS. 1 and 2 is such as to permit the secondary member to rotate both as a double rotation system and as a single rotation system. Shifting from one type of operation to the other is effected by means of servomotors. A reversing gear is inserted to transmit torque from the reaction member to the turbine shaft when operation as a double rotation system takes place.

The valve 350 controlling the pressure liquid to the friction clutch 250 is controlled by a servomotor 352, the piston of which actuates a forked lever 354 for axially moving a ring 356 and the control valve 350 fixed to said ring.

A brake 358 is arranged between the reaction member and the stationary housing (as shown in FIG. 1), said brake consisting of a brake band 360 (FIG. 2) and a lever 364 actuated by the servomotor 362. The brake drum is integral with the member 252, surrounding the friction clutch. The brake is intended to lock the guide member during those operating stages when the guide blades should operate as a stationary reaction member but to release the same for double rotation and direct drive.

The reversing gear between the extension 62 of the guide member shaft and the turbine shaft 44 consists of a toothed rim 366, integral with the extension 62, a gear wheel 368 secured to the turbine shaft and intermediate gear wheels 370, supported by shafts projecting from a ring 376 rotatably supported by bearings 372 and 374. A free wheel 378 between said ring and the stationary housing prevents the ring from rotating in a direction opposite to that of the pump but leaves it free to rotate in the same direction. In other words, the reversing gear is put out of action under all conditions except when the torque from the reaction member is transmitted therethrough.

The pressure liquid to the friction clutch and to the two servomotors is delivered by a pump 380, driven by the primary member of the converter through three gears 382, 384 and 386. The pump sucks liquid through an opening 388 and delivers it to a bore 390, branching into two bores 392 and 394, the first of which communicates with the channel system of a regulating valve 396 and the second being connected to the converter circuit.

At a position of regulating valve as indicated by a in FIG. 1 the communication between the servomotors and the pressure bore 392 is interrupted and, instead, said motors are in open communication with the base tank of the converter through channels 398 and 402, 400 and 404, respectively, so that the spring-loaded servomotor pistons assume the positions corresponding to emptied cylinders. The servomotor 352 and the valve 350 are mechanically connected by the ring 356 and the lever 354 in such manner that said valve establishes open communication between the operating chamber 264 and the outlet opening 286 when the pressure bore 392 is closed, a position corresponding to disengaged friction clutch. In this position the servomotor 362, the piston rod of which actuates the lever 364 connected to the brake band 360 also releases the guide member, so that said guide member is mechanically connected to the turbine shaft only by the reversing gear but can otherwise rotate freely under the influence of the liquid flow in the converter circuit. At low speed ratios $n_2/n_1$, for instance at starting, the arrangement shown in FIG. 1 is especially advantageous due to the fact that the reaction member rotates in a direction opposite to that of the blade rings 34 and 36 so that the high torque multiplication of a turbine of the double rotation type can be utilized.

FIG. 3 is a diagram, showing the relation between the efficiency $\eta$ and the output torque $M_2$ as functions of the speed ratio $n_2/n_1$ in a converter constructed according to FIGS. 1 and 2. The efficiency curve $\eta$ consists of three portions $a$, $b$ and $c$ corresponding to the efficiency curves for double rotation, single rotation and direct drive, respectively.

In FIG. 2 the arrow A indicates the direction of rotation of the turbine shaft and the arrow B the corresponding direction of the guide member during double rotation drive. As is clear from FIG. 2, the design of the free wheel 110 permits such drive. The torque acting upon the reaction member is transmitted to the turbine shaft by means of the above mentioned reversing gears 366, 368 and 370, which in this construction also reduce the speed of the reaction member. The ring 376 is subjected to a torque tending to turn the ring in a direction opposite to that of the pump, but such movement is prevented by the free wheel 378.

If the regulating valve sleeve 396 is shifted to position $b$ in FIG. 1 the conditions for the servomotor 352 will be unchanged but the outlet 398 of the other servomotor 362 is closed and the working chamber is connected through channel 402 to the pressure bore 392, whereupon pressure liquid moves the servomotor piston to its other end position, immediately causing the locking of the guide member to the stationary housing by means of the brake 358. The secondary member of the converter operates then as a turbine having a single rotation system having an efficiency curve, the peak of which is located at higher $n_2/n_1$ values as compared with the characteristics of the double rotation system.

In this stage of operation (position $b$ single rotation), the ring 376 with the planet gears 370 released from the free wheel 378 rotates between the toothed rims 366 and 368 in the same direction as the turbine shaft without transmitting any torque.

By moving the regulating valve sleeve 396 to position $c$ the two servomotors reverse their action as compared with position $b$. The servomotor 362 is cut off from the pressure pipe 392 and the outlet for the operating liquid opens again to the base tank, resulting in a release of the brake band 360 acting on the reaction member. Simultaneously, the outlet 400 from the operating chamber of the servomotor 352 is closed and communication opened through channel 404 to the pressure pipe 392, resulting in a movement of the ring 356 carrying the valve 350, so that the operating chamber 264 of the friction clutch is brought into communication with the radial bore 266 after the outlet 286 has been closed, with the result that pressure liquid starts acting upon the piston 258 and presses the clutch members against one another, compelling the reaction member and, due to the free wheel 110, also the turbine member, to rotate at the same speed as the pump. Direct drive is thus established.

The reversing gear 376 now rotates in the same direction and with the same absolute speed as the rest of the gearing.

The device designated 410 (FIGS. 1 and 2) is merely operative to lift the brake band from the brake drum as soon as the brake is released in order to prevent useless wear of the brake members.

FIGS. 4 and 5 show a modification of the reversing gear described with reference to FIGS. 1 to 3.

Planet gears 500 are mounted on shafts 502, directly connected to the stationary housing of the converter. These planet gears mesh with a toothed rim 504 on the member 252 and with a gear 512 journalled at 508 and 510 on a sleeve 506, secured to the turbine shaft 44.

In the same manner as previously described the position $a$ corresponds to a stage of operation, where the reaction member rotates in a direction opposite to that of the pump, that is to a double rotation converter drive, at low speed ratios $n_2/n_1$. The torque of the reaction member, transmitted to the turbine shaft through the reversing gear is at the same time multiplied by said gear. In this operation a free wheel 514 prevents the gear 512 from rotating relative to the sleeve 506 and the turbine shaft 44. In this case as well as in the construction described with reference to FIGS. 1 to 3, the reversing gear may comprise, if desired, conical gears so as to provide change of gear ratio.

In position $c$ of the valve 396 corresponding to direct drive the band brake releases the reaction member at the same moment as the friction clutch is engaged and connects the pump and reaction members. The free wheel 110 between the reaction and turbine members also forces the latter to run at primary speed while at the same time the free wheel 514 is freewheeling.

If the valve 396 is moved to position $b$ the brake band locks the reaction member to the stationary housing. The sleeve 506 rotates freely relative to the stationary gear wheel 512 without being prevented by the free wheel 514. The action thus corresponds to that of a converter having the turbine member acting as a single rotation system.

What I claim is:

1. A hydrodynamic torque converter providing a toroidal chamber for working liquid defined by an outer wall and an inner wall, the inner wall being provided by an annular core structure spaced from the outer wall, said toroidal working chamber providing a closed circuit for circulation of the working liquid and said circuit comprising portions in which the flow of the working liquid is generally radially inward or generally radially outward, connected by portions in which the flow is generally axial, pump means including at least one ring of pump blades located in said circuit for circulating the working liquid therein, turbine means including at least two rings of turbine blades located in said circuit, reaction means including at least one ring of reaction blades located in said circuit, the blades of said reaction means being located in the portion of the circuit in which flow of the working liquid is generally radially inward, the arrangement of the several blade means being such that the flow of the working liquid discharged from the pump is directed to a first ring of turbine blades from which the liquid is discharged directly to the reaction means and from the reaction means directly to a second ring of turbine blades, the discharge from the turbine means being delivered to the inlet of the pump means, said reaction means being rotatably mounted to permit rotation thereof, and power transmitting means interconnecting said reaction means and said turbine means to provide for simultaneous rotation of the turbine and reaction means at a fixed speed ratio relative to each other.

2. A hydrodynamic torque converter providing a toroidal chamber for working liquid defined by an outer wall and an inner wall, the inner wall being provided by an annular core structure spaced from the outer wall, said toroidal working chamber providing a closed circuit for circulation of the working liquid and said circuit comprising portions in which the flow of the working liquid is generally radially inward or generally radially outward, connected by portions in which the flow is generally axial, pump means including at least one ring of pump blades located in said circuit for circulating the working liquid therein, turbine means including at least two rings of turbine blades located in said circuit, reaction means including at least one ring of reaction blades located in said circuit, the blades of said reaction means being located in the portion of the circuit in which the flow of the working liquid is generally radially inward, the arrangement of the several blade means being such that the flow of the working liquid discharged from the pump is directed to a first ring of turbine blades from which the liquid is discharged directly to the reaction means and from the reaction means directly to a second ring of turbine blades, the discharge from the turbine means being delivered to the inlet of the pump means, said reaction means being rotatably mounted to permit rotation thereof in a direction opposite that of said pump means and said turbine means, and power transmitting means interconnecting said reaction means and said turbine means to provide for simultaneous rotation of the turbine and reaction means at a fixed speed ratio in opposite directions.

3. A hydrodynamic torque converter providing a toroidal chamber for working liquid defined by an outer wall and an inner wall, the inner wall being provided by an annular core structure spaced from the outer wall, said toroidal working chamber providing a closed circuit for circulation of the working liquid and said circuit comprising portions in which the flow of the working liquid is generally radially inward or generally radially outward, connected by portions in which the flow is generally axial, pump means including at least one ring of pump blades located in said circuit for circulating the working liquid therein, turbine means including at least two rings of turbine blades located in said circuit, reaction means including at least one ring of reaction blades located in said circuit, the blades of said reaction means being provided in the portion of the circuit in which the flow of the working liquid is generally radially inward, the arrangement of the several blade means being such that the flow of the working liquid discharged from the pump is directed to a first ring of turbine blades from which the liquid is discharged directly to the reaction means and from the reaction means directly to a second ring of turbine blades, the discharge from the turbine means being delivered to the inlet of the pump means, said reaction means being rotatably mounted and having brake means associated therewith for holding the reaction means rotationally stationary or releasing the same to permit rotation thereof in a direction opposite that of said pump means and said turbine means, and power transmitting means interconnecting said reaction means and said turbine means to provide for simultaneous rotation of the turbine and reaction means at a fixed speed ratio in opposite directions.

4. A hydrodynamic torque converter providing a toroidal chamber for working liquid defined by an outer wall and an inner wall, the inner wall being provided by an annular core structure spaced from the outer wall, said toroidal working chamber providing a closed circuit for circulation of the working liquid and said circuit comprising substantially straight radial inflow and radial outflow portions connected by radially inner and radially outer return bend portions, pump means including at least one ring of pump blades located in said circuit for circulating the working liquid therein, turbine means including at least two rings of turbine blades located in said circuit, reaction means including at least one ring of reaction blades located in said circuit, the blades of said reaction means being located in the radially inflow portion of the circuit and disposed so that substantially all of the blade structure is located radially inwardly of the outer diameter of said annular core structure, the arrangement of the several blade means being such that the flow of the working liquid discharged from the pump is directed to a first ring of turbine blades from which the liquid is discharged directly to the reaction means and from the reaction means directly to a second ring of turbine blades, the discharge from the turbine means being delivered to the inlet of the pump means, said reaction means being rotatably mounted and having brake means associated therewith for holding the reaction means rotationally stationary or releasing the same to permit rotation thereof in a direction opposite that of said pump means and said turbine means, and power transmitting means interconnecting said reaction means and said turbine means to provide for simultaneous rotation of the turbine and reaction means at a fixed speed ratio in opposite directions.

References Cited in the file of this patent

UNITED STATES PATENTS

| | | |
|---|---|---|
| 2,042,189 | Rabe | May 26, 1936 |
| 2,270,515 | Dodge | Jan. 20, 1942 |
| 2,578,450 | Pollard | Dec. 11, 1951 |